United States Patent

Choi

[11] Patent Number: 5,845,503
[45] Date of Patent: Dec. 8, 1998

[54] REFRIGERATOR HAVING DEGREE CONTROL MEANS AND CONTROL METHOD THEREOF

[75] Inventor: Dong-Kyoo Choi, Seongnam, Rep. of Korea

[73] Assignee: Samsung Electronics Co., Ltd., Suwan, Rep. of Korea

[21] Appl. No.: 901,718

[22] Filed: Jul. 28, 1997

[30] Foreign Application Priority Data

Sep. 25, 1996 [KR] Rep. of Korea ....................... 96-42546
May 24, 1997 [KR] Rep. of Korea ....................... 97-20593

[51] Int. Cl.⁶ .................................................. F25B 41/04
[52] U.S. Cl. .................................... 62/89; 62/211; 62/223
[58] Field of Search .............................. 62/186, 222, 223, 62/210, 211, 89

[56] References Cited

U.S. PATENT DOCUMENTS 5,224,354  7/1993  Ito et al. ..................................... 62/222
5,241,833  9/1993  Ohkoshi ..................................... 62/222
5,598,717  2/1997  Sakamoto et al. ......................... 62/223

*Primary Examiner*—William E. Tapolcai
*Attorney, Agent, or Firm*—Burns, Doane, Swecker & Mathis, L.L.P.

[57] ABSTRACT

A refrigerator having an opening degree control means and a control method thereof which have an opening degree control means for controlling a refrigerant flow provided into each evaporator, and thus enhance an energy efficiency, in a refrigerator which independently cools or maintains the freezing and refrigerating compartments at different temperatures by including an evaporator in each of the freezing and refrigerating compartments. The refrigerator includes: a compressor; a condenser; a refrigerating compartment and a freezing compartment which are divided to be separately cooled; first and second evaporators which are respectively mounted into the refrigerating and freezing compartments; a refrigerating fan and a freezer fan which are respectively mounted in the refrigerating and freezing compartments; opening degree control means for varying a pressure difference between a high pressure side and a low pressure side by controlling a flow of the refrigerant; and control unit for controlling the aforementioned components. As a result, the present invention varies the opening degree of the opening control means in order to vary a pressure difference between the high pressure side and the low pressure side, thereby lowering a power driving loss of the compressor and enhancing an energy efficiency.

7 Claims, 12 Drawing Sheets

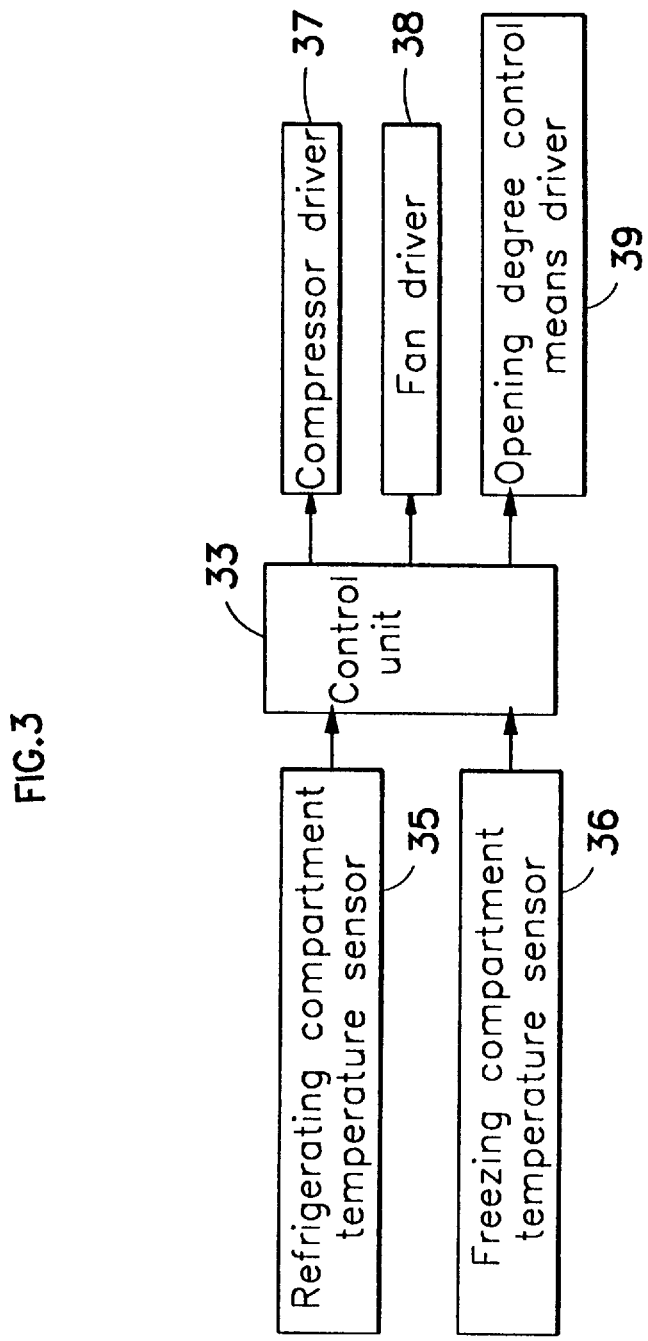

REFRIGERATOR HAVING DEGREE CONTROL MEANS AND CONTROL METHOD THEREOF

BACKGROUND OF THE INVENTION (1) Field of the Invention

The present invention relates to a refrigerator having an opening degree control means and a control method thereof. More particularly, it relates to a refrigerator having an opening degree control means and a control method thereof which have an opening degree control means for controlling a refrigerant flow provided into each evaporator, and thus enhance an energy efficiency, in a refrigerator which independently cools or maintains the freezing and refrigerating compartments at a different temperatures by including an evaporator in each of the freezing and refrigerating compartments.

(2) Description of the Prior Art

FIG. 1 is a cooling cycle of a conventional refrigerator.

As shown in FIG. 1, in the cooling cycle, a compressor 5, a condenser 6, a capillary tube 7, and a first evaporator 1 and a second evaporator 3 are connected by a refrigerant duct 8, thus achieving a closed loop. A refrigerating fan 2 and a freezer fan 4 are installed in the vicinity of the evaporators 1 and 3. Accordingly, all refrigerant passing through the first evaporator 1 pass through the second evaporator 3.

As shown in arrow of FIG. 1, a state of the refrigerant is changed while flowing in the refrigerant duct 8. Particularly, the refrigerant is evaporated while passing through the first and second evaporators 1 and 3, and absorbs a heat from the air passing through the evaporators 1 and 3, thereby generating a cool air. The cool air is provided in the freezing and refrigerating compartments by operations of the refrigerating fan 2 and freezer fan 4.

However, the conventional refrigerator includes a capillary tube. After the capillary tube is installed in the refrigerator, the capillary tube cannot control a discharge pressure for discharging the refrigerant and an intake pressure for sucking the refrigerant according to a variation of the load corresponding to the amount of the refrigerant in the evaporators. Therefore, using the capillary tube is inefficient. That is, since the capillary tube is previously designed in a predetermined operating condition, an energy efficiency of the refrigerator becomes lowered when a condensing temperature is not suitable to a used thermal load and a design condition.

SUMMARY OF THE INVENTION

Accordingly, the present invention is directed to a refrigerator having an opening degree control means and a control method thereof that substantially obviate one or more of the problems due to limitations and disadvantages of the related art.

It is an objective of the present invention to provide a refrigerator having an opening degree control means and a control method thereof which have an opening degree control means for controlling a refrigerant flow provided into each evaporator, and thus enhance an energy efficiency, in a refrigerator which independently controls the freezing and refrigerating compartments by including evaporators in each of the compartments.

To achieve the above objective, in a refrigerator which includes: a compressor for compressing a refrigerant, a condenser for condensing the refrigerant compressed, a refrigerating compartment and a freezing compartment which are divided to be separately cooled, first and second evaporators which are respectively mounted into the refrigerating and freezing compartments and in series connected to each other, and a refrigerating fan and a freezer fan which are respectively mounted in the refrigerating and freezing compartments; and thereby achieves a cooling cycle, a refrigeration system according to the present invention includes:

opening degree control means for including a bendable structure so as to vary a pressure difference between a high pressure side and a low pressure side according to a cooling operation of either the refrigerating compartment or the freezing compartment; and control unit for controlling a bending degree of the opening degree control means according to a kind of a driven fan after driving a corresponding fan responsive to a cool-driven compartment.

In a refrigerator which includes: a compressor for compressing a refrigerant, a condenser for condensing the refrigerant compressed, a refrigerating compartment and a freezing compartment which are divided to be separately cooled, first and second evaporators which are respectively mounted into the refrigerating and freezing compartments and in series connected to each other, and a refrigerating fan and a freezer fan which are respectively mounted in the refrigerating and freezing compartments, and an opening degree control means which is installed between the condenser and the evaporators so as to control a flow of the refrigerant, a method for controlling the refrigerator according to the present invention includes the steps of:

(a) sensing temperatures of the refrigerating and freezing compartments;

(b) determining whether or not at least one compartment requires a cooling operation by comparing the temperatures with predetermined temperatures of the refrigerating and freezing compartments;

(c) driving a corresponding fan for cooling a corresponding compartment when at least one compartment requires a cooling operation in the step (b); and (d) controlling a bending degree of the opening degree control means according to the corresponding driven fan in the step (c), and adjusting a flow of the refrigerant.

If there is a cooling request of the refrigerating compartment in the step (b), the refrigerating fan is driven in the step (c), and the bending degree of the opening degree control means in the step (d) becomes larger. On the contrary, if there is a cooling request of the freezing compartment in the step (b), the freezer fan is driven in the step (c), and the bending degree of the opening degree control means in the step (d) becomes smaller.

BRIEF DESCRIPTION OF THE DRAWINGS

Further objects and other advantages of the present invention will become apparent from the following description in conjunction with the attached drawings, in which:

FIG. 3 is a block diagram of a refrigerator according to the present invention;

DETAILED DESCRIPTION OF THE PREFERRED EMBODIMENTS

Figure 1:
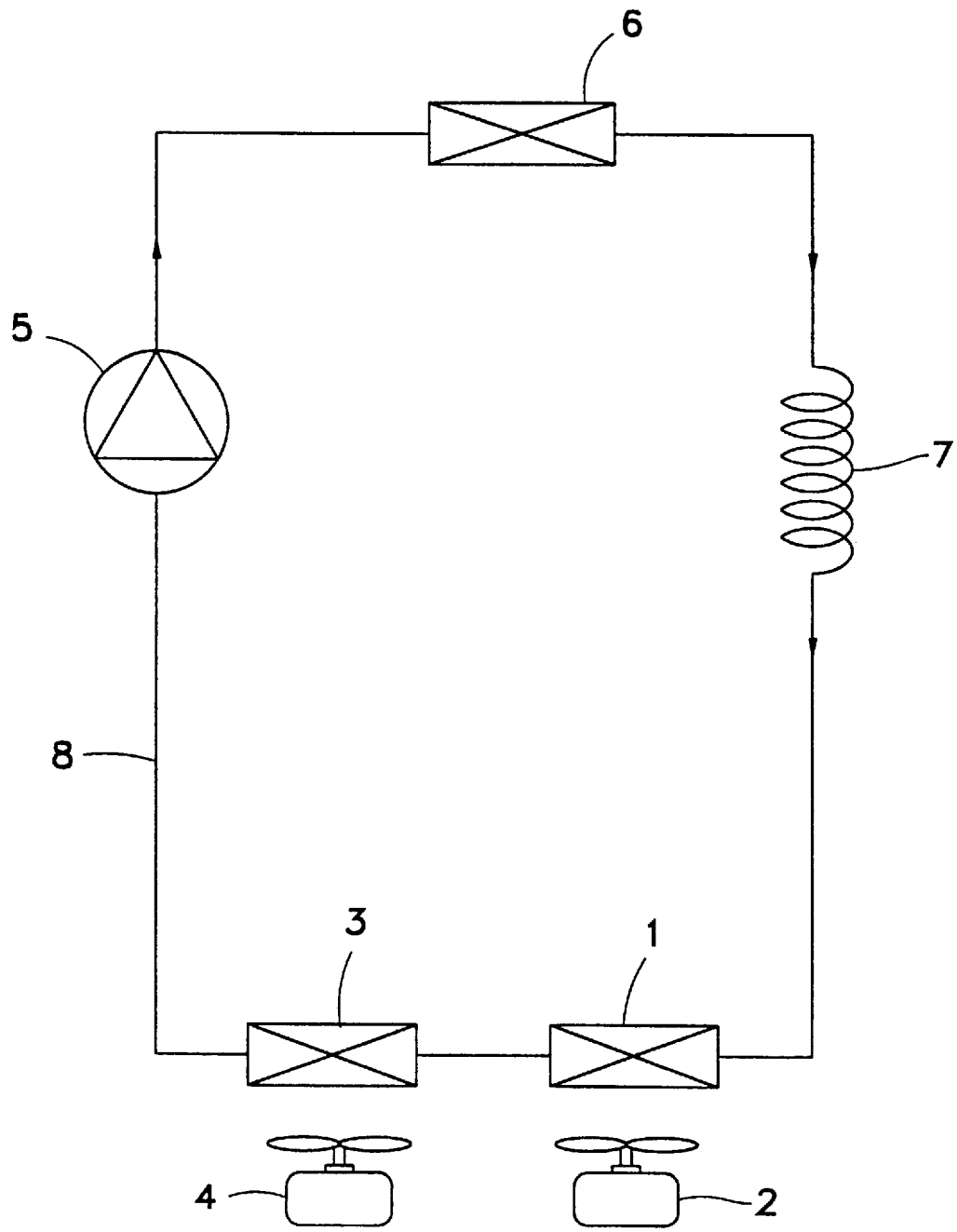
FIG. 1 is a cooling cycle of a conventional refrigerator.

The preferred embodiments of the present invention will now be described in detail with reference to the accompanying drawings.

Referring to FIGS. 2, 3, 4A and 4B, the refrigerator according to the present invention includes: a compressor 31 for compressing a refrigerant; a refrigerating compartment 23 and a freezing compartment 22 which are divided to be separately cooled at a different temperature; a first evaporator 27 which is mounted in the refrigerating compartment 23; a refrigerating fan 28 which is mounted in the refrigerating compartment 23, and ventilates the refrigerating compartment 23's inside air to be passed through the first evaporator 27; a second evaporator 29 which is mounted in the freezing compartment 22, and is connected in series with the first evaporator 27; a freezer fan 30 which is mounted in the freezing compartment 22, and ventilates the freezing compartment 22's inside air to be passed through the second evaporator 29; a refrigerating compartment temperature sensor 35 for sensing a temperature of the refrigerating compartment 23; a freezing compartment temperature sensor 36 for sensing the freezing compartment 22; and a control unit 33 which controls the compressor 31, the refrigerating fan 28, the freezer fan 30, and the opening degree control means 40 according to the sensed temperature of the freezing and refrigerating compartments 22 and 23.

Figure 2:
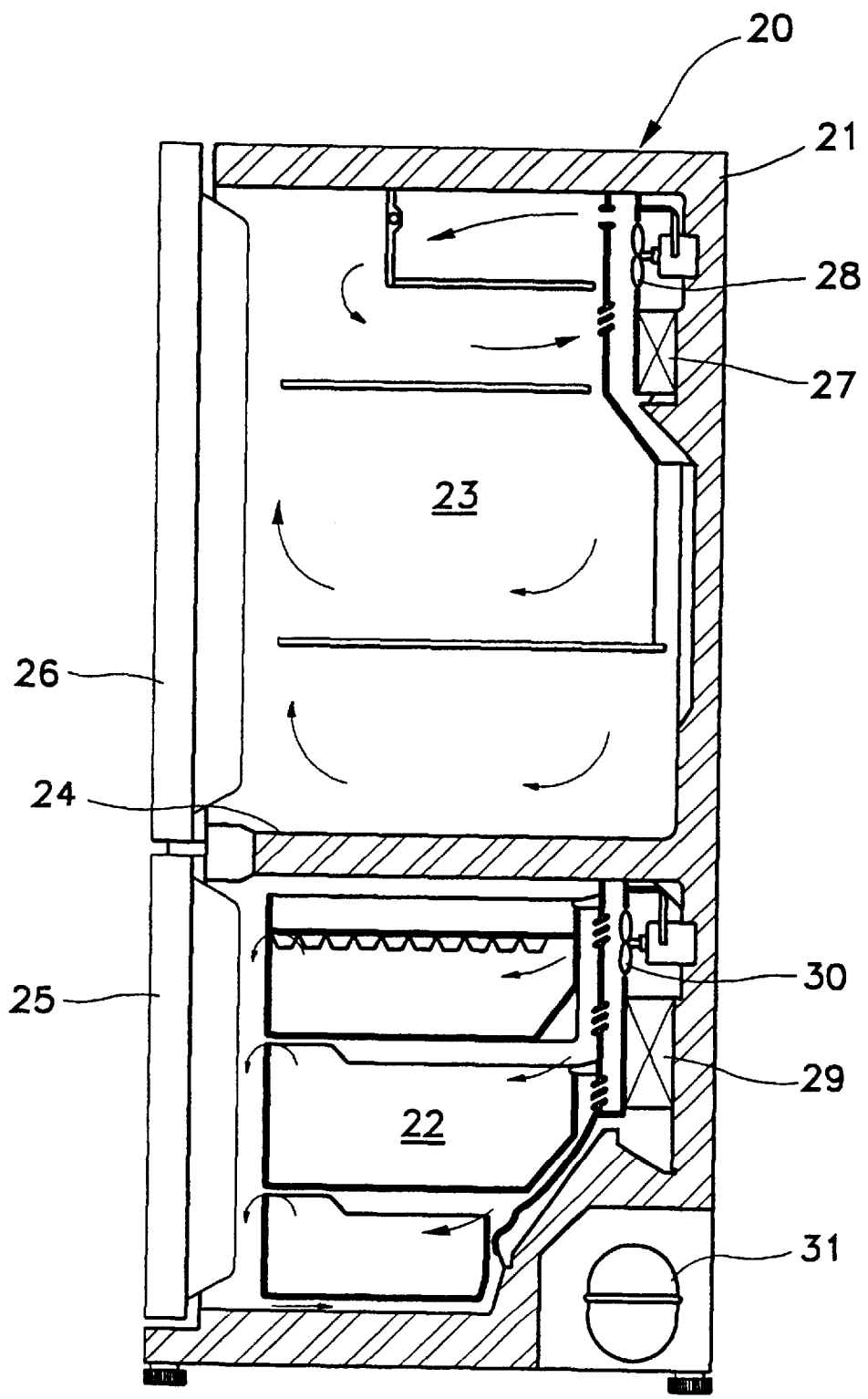
FIG. 2 shows an internal structure of a refrigerator according to the present invention.

Further, referring to FIG. 2, the numeral 24 is a central wall for dividing the refrigerating and freezing compartments, the numeral 20 is a main body, the numeral 21 is a rear wall, the numeral 25 is a freezing compartment door, and the numeral 26 is a refrigerating compartment door.

As shown in FIG. 3, in addition to the control unit 33, the freezing compartment temperature sensor 35 and the refrigerating compartment temperature sensor 36, the refrigerator according to the present invention further includes a fan driver 38 for driving the refrigerating and freezer fans 28 and 30; a compressor driver 23 for driving the compressor 31; and an opening degree control means driver 39 for controlling the opening degree control means 40.

Figure 4A:
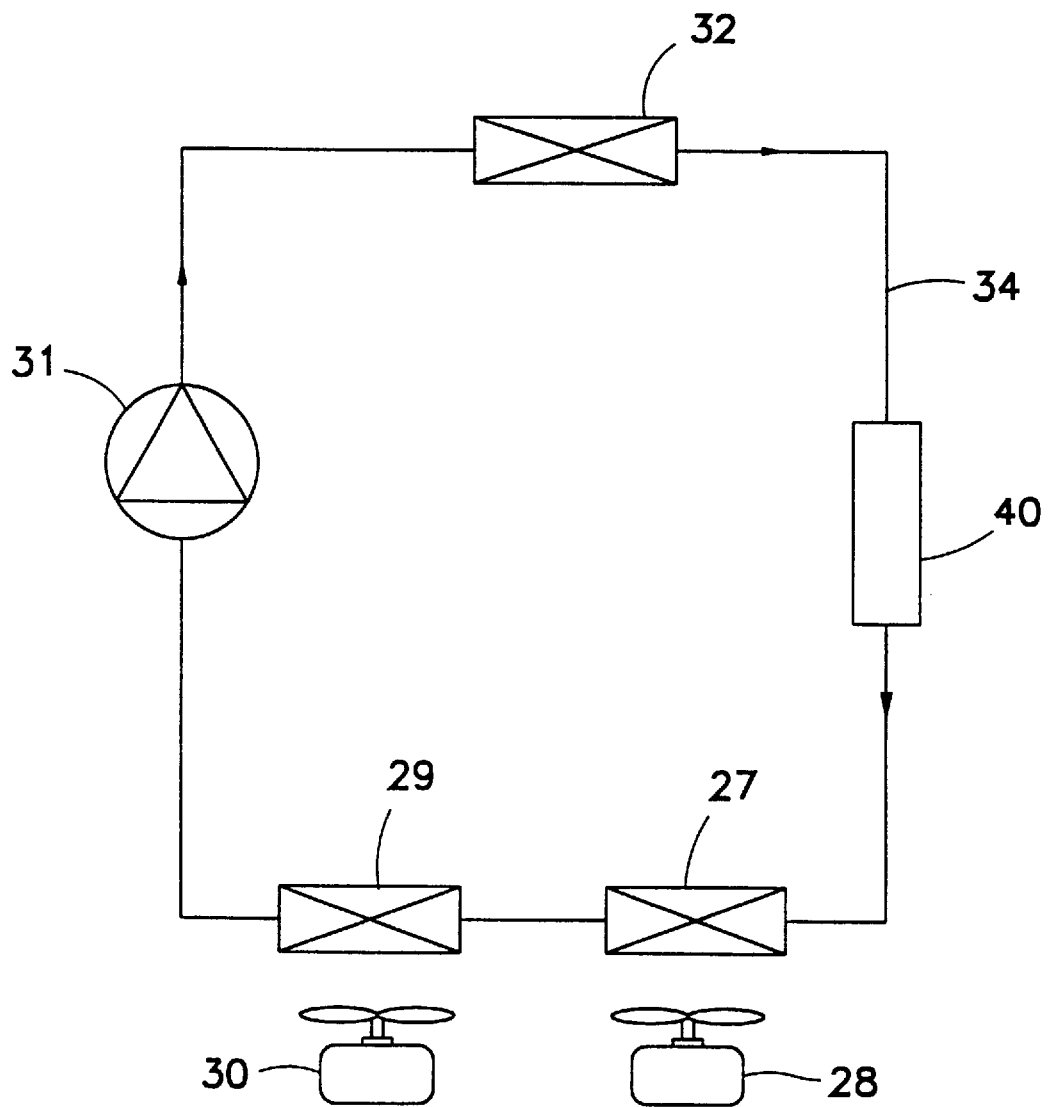
FIG. 4A is a cooling cycle of a refrigerator in accordance with a preferred embodiment of the present invention.

The cooling cycle of the refrigerator in accordance with a preferred embodiment of the present invention is shown in FIG. 4A. That is, the compressor 31, the condenser 32, the opening degree control means 40, the first evaporator 27 and the second evaporator 29 are sequentially connected by a refrigerant duct 34, thereby achieving a closed loop. The refrigerating fan 28 and the freezer fan 30 are mounted in the vicinity of the first and second evaporators 27 and 29. Especially, the first evaporator 27 and the second evaporator 29 are connected in series, all refrigerants passing through the first evaporator 27 pass through the second evaporator 29.

As shown in arrow of FIG. 4A, a state of the refrigerant is changed while flowing in the refrigerant duct 34. Particularly, the refrigerant is evaporated while passing through the first and second evaporators 27 and 29, and absorbs a heat from the air passing through the evaporators 27 and 29, thereby generating a cool air. The cool air is provided in the freezing and refrigerating compartments 22 and 23 by operations of the refrigerating fan 28 and freezer fan 30.

The status change process of the refrigerant will now be more specifically described below.

The refrigerant is compressed in the compressor 31 at a high temperature and a high pressure, the compressed refrigerant is condensed by a heat exchange while flowing the condenser 32. The compressed refrigerant is depressurized while passing through the opening degree control means 40, is evaporated with flowing in the first evaporator 27 and the second evaporator 29, thereby generating a cool air.

The first evaporator 27 and the second evaporator 29 are arranged in series and there is no element between them 27 and 29. Some refrigerants are evaporated while passing the first evaporator 27, the remaining refrigerants are evaporated while passing the second evaporator 29, thereby all refrigerants becomes a gas state. Such refrigerants are sucked into the compressor 31, thereby making the cooling cycle which is repeated in response to the operation of the compressor 31.

The refrigerant is evaporated by absorbing heat passing the evaporators 27 and 29 due to the operations of the refrigerating fan 28 and the freezer fan 30. As shown in FIG. 4A, the cool air is provided in both compartments, thereby cooling the both compartments 23 and 22.

At this time, since the temperature of air in the first evaporator 27 of the refrigerating compartment 23 is relatively higher than that in the second evaporator 29, the refrigerant temperature of the second evaporator 29 is relatively low while the refrigerant temperature of the first evaporator 27 is high.

Figure 4B:
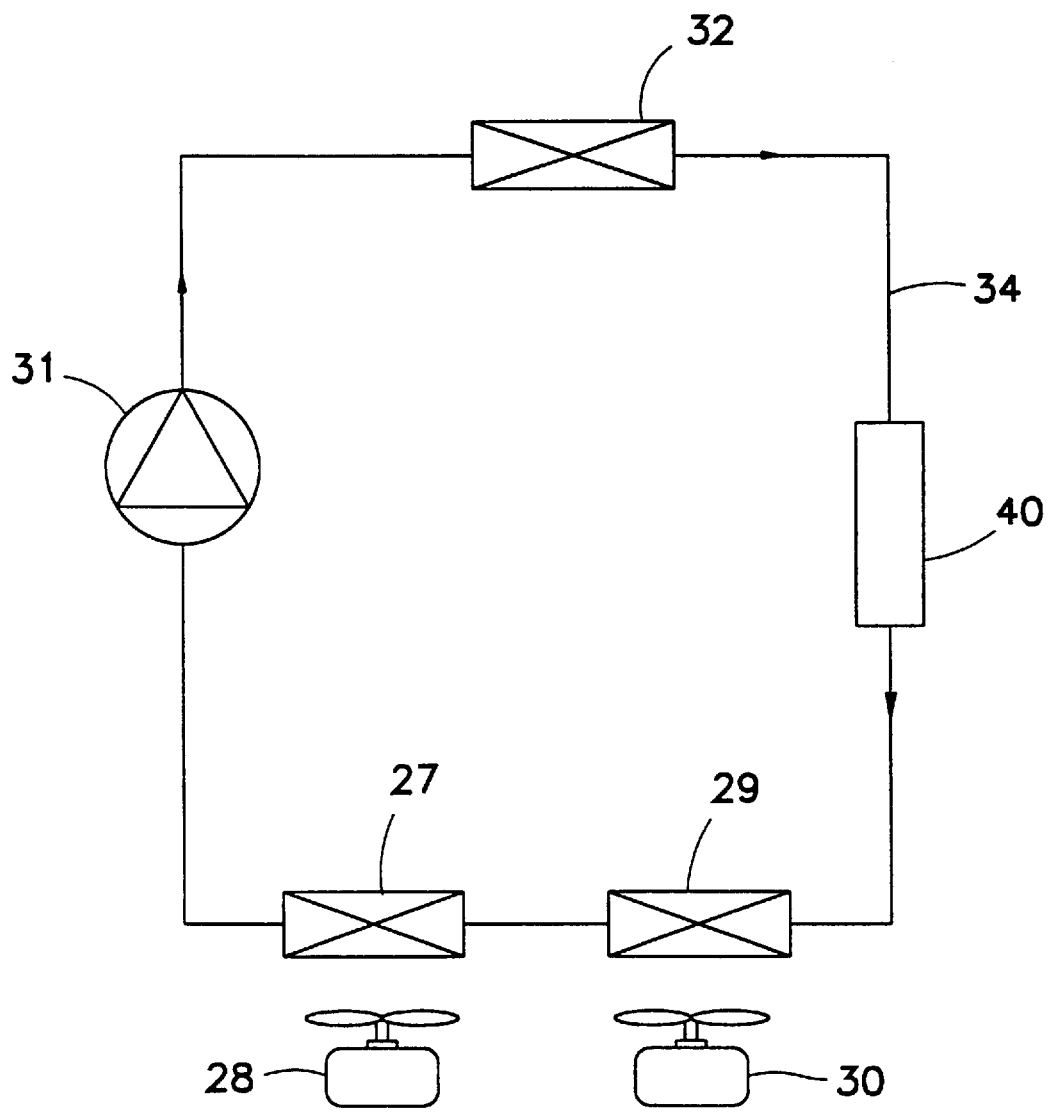
FIG. 4B is a cooling cycle of a refrigerator in accordance with another preferred embodiment of the present invention.

The cooling cycle of a refrigerator according to another preferred embodiment is shown in FIG. 4B. That is, the compressor 31, the condenser 32, the opening degree control means 40, the second evaporator 29, and the first evaporator 27 are connected in series by the refrigerant duct 34, thereby making a closed loop. The freezer fan 30 is mounted in the vicinity of the second evaporator 29, and the refrigerating fan 28 is mounted in the vicinity of the first evaporator 27. Herein, the refrigerant passes through the first evaporator 27 in the first preferred embodiment, and then passes through the second evaporator 29. However, in the second preferred embodiment, the refrigerant first passes through the second evaporator 29, and then passes through the first evaporator 27. Excepting the position of the evaporators, the second preferred embodiment is the same as the first preferred embodiment, so that a detailed description about the second preferred embodiment will not be described below.

In the first and second preferred embodiments, the compressor 31 and the condenser 32 are high pressure sides wherein the refrigerant is maintained at a high pressure, the first and second evaporators 27 and 29 are low pressure sides wherein the refrigerant is maintained at a low pressure. The opening degree control means 40 depressurizes the refrigerant of the high pressure sides, and discharges the refrigerant toward the low pressure sides.

Figure 5A:
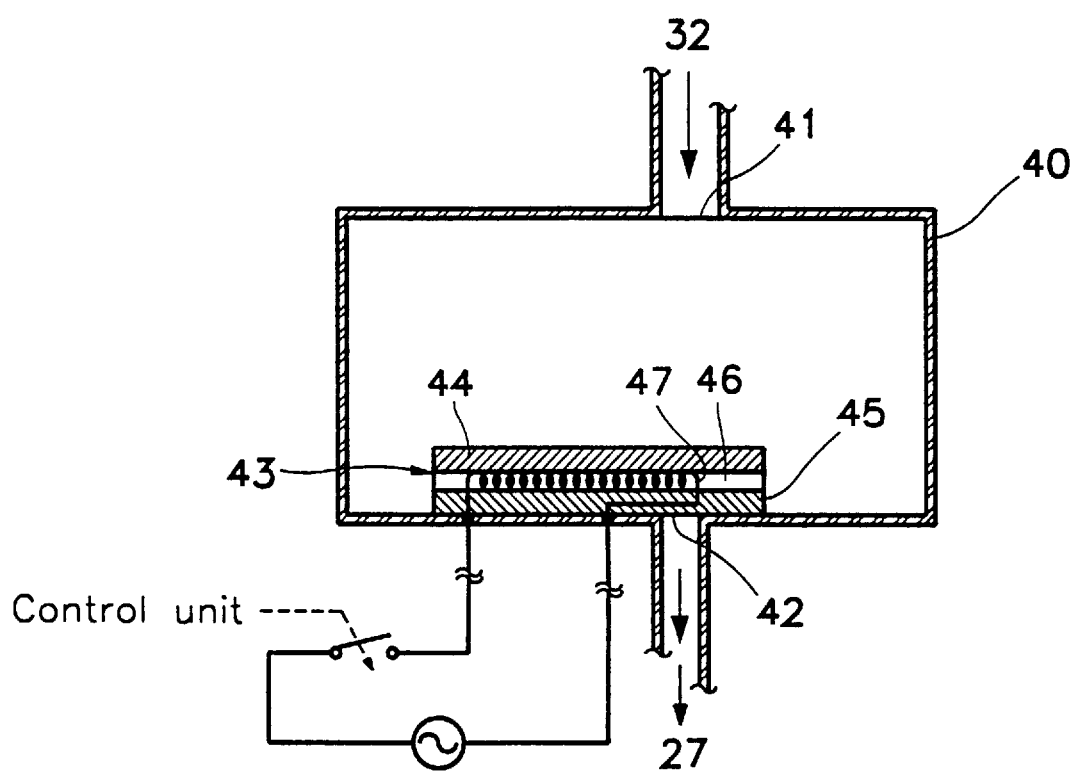
FIG. 5A is a cross-sectional view illustrating an opening degree control means which is closed when the power-supply is not applied to the refrigerator.
Figure 5B:
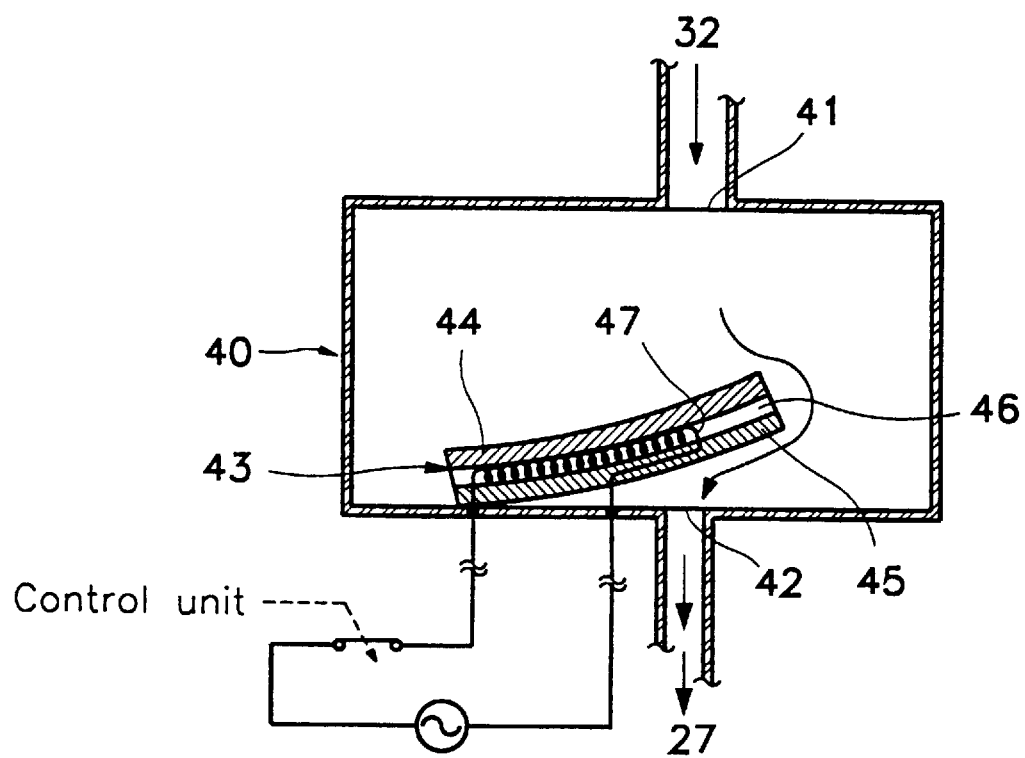
FIG. 5B is a cross-sectional view illustrating an opening degree control means which is open at a predetermined angle when the power-supply is applied to the refrigerator.
Figure 5C:
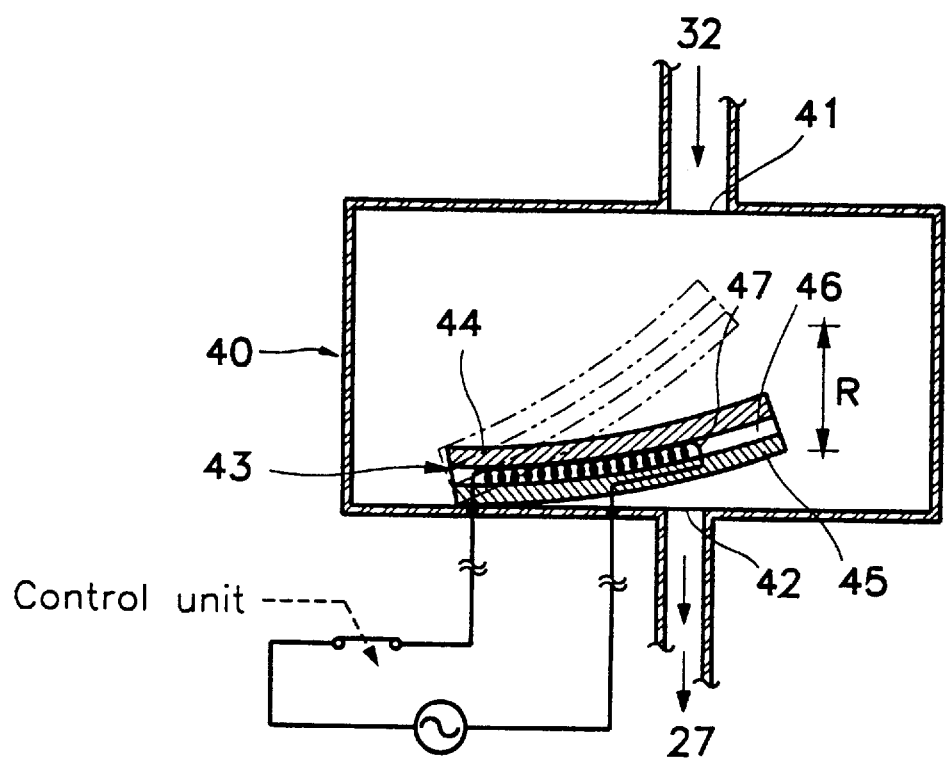
FIG. 5C shows an opening degree control range of the opening degree control means according to the present invention, which opening range is varied in response to a refrigerating compartment cooling request or a freezing compartment cooling request.

FIG. 5A is a cross-sectional view illustrating an opening degree control means which is closed when the power-supply is not applied to the refrigerator;

FIG. 5B is a cross-sectional view illustrating an opening degree control means which is open at a predetermined angle when the power-supply is applied to the refrigerator; and FIG. 5C shows an opening degree control range of the opening degree control means according to the present invention, which opening range is varied in response to a refrigerating compartment cooling request or a freezing compartment cooling request.

As shown in FIG. 5A, an intake hole 41 for sucking a condensed refrigerant is formed to one portion of the opening degree control means 40, and a discharge hole 42 for providing a depressurized refrigerant into the first evaporator 27 is formed to other portion of the opening degree control means 40. Further, the opening degree controller 43 which controls a opening degree of the discharge hole 42 according to the power-supply's on or off state is mounted to one side of the discharge hole 42. Herein, the size of the discharge hole 42 is smaller than that of the intake hole 41 in order to depressurize the refrigerant.

In the opening degree controller 43, two silicon substrates 44 and 45 having a different heat expansion rate are united on both sides of the glass layer 46. A heater 47 which is heated by an external power-supply winds up the glass layer 46. One portion of the opening degree controller 43 is fixed on the bottom of the opening degree control means 40.

As shown in FIG. 5B, in the opening degree control means 40, when the heater 47 is heated after receiving a power-supply, the silicon substrates 44 and 45 are expanded by heat of the heater 47. Since the expansion rates of both substrates 44 and 45 are different from each other, the opening degree controller 43 is bent upward or downward centering around a fixed portion according to a temperature variation of the heater 47.

At this point, if the heat expansion rate of the upper silicon substrate 44 is larger than that of the lower silicon substrate 45, the opening degree controller 43 is bent upward by a predetermined degree, thereby opening the discharge hole 42 as shown in FIG. 5B.

At this time, if the power-supply time is controlled from the outside, the temperature from the heater 47 is to be varied. A bending degree of the opening degree controller 43 is varied in the predetermined range R shown in FIG. 5C, so that the opening degree of the discharge hole 42 can be controlled.

Figure 7A:
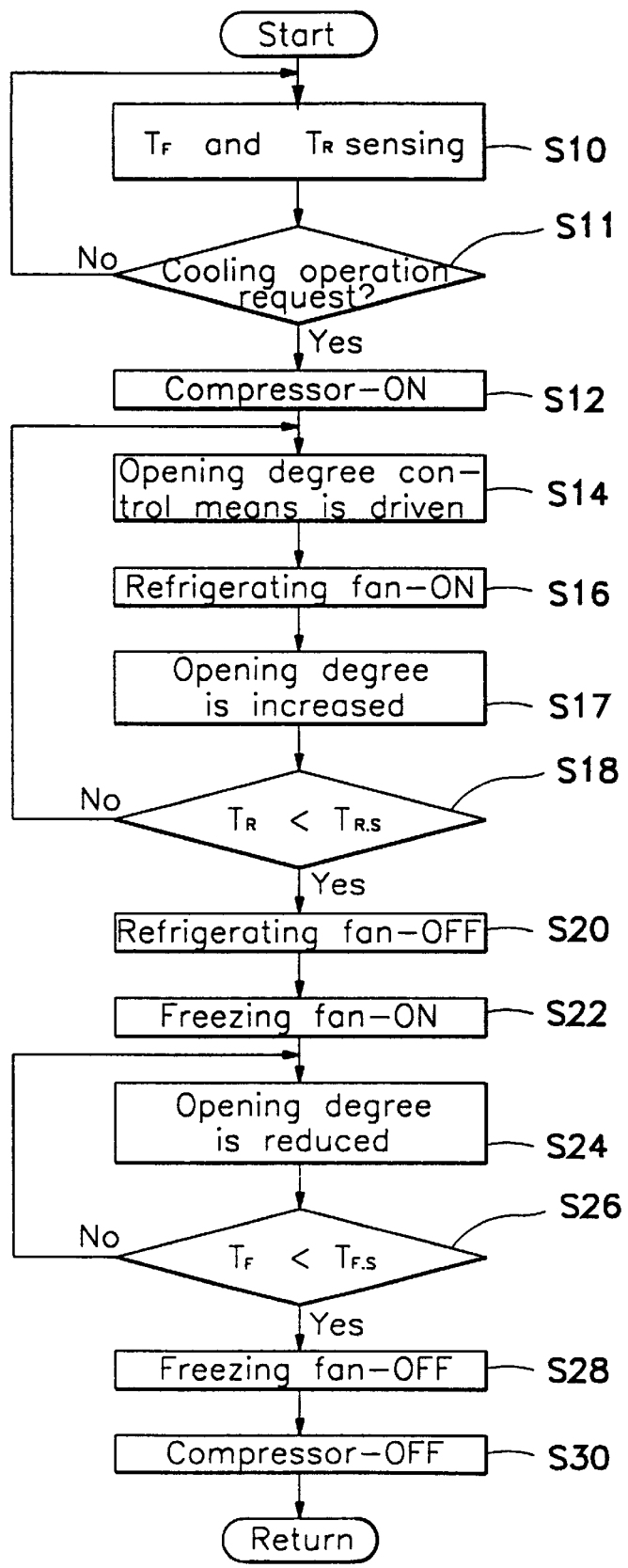
FIG. 7A is a control method for a refrigerator in accordance with a preferred embodiment of the present invention.

A method for controlling the refrigerator according to the first preferred embodiment of the present invention is shown in FIG. 7A. As shown in FIG. 7A, a refrigerating compartment temperature TR and a freezing compartment temperature TF are sensed in a step S10. In the step S11, the freezing compartment temperature TF and the refrigerating compartment temperature TR are compared with each reference temperature and it is determined whether or not at least one compartment requests a cooling operation. If there is a cooling operation request in at least one compartment in the step S11, a compressor 31 is driven in a step S12. In a step S14, after the compressor 31 and the opening degree control means 40 receive a power-supply, the opening degree control means 40 is open by a predetermined degree, thereby refrigerant duct between the condenser 32 and the evaporators becomes open. More specifically, the heater 47 is heated, the discharge hole 42 is open by a predetermined degree due to expansions of silicon substrates 44 and 45, so that the refrigerant in the high pressure sides is depressurized by a predetermined degree and flows in the first evaporator 27.

In a step S16, in order to expedite a heat exchange of the refrigerating compartment' air in the first evaporator 27, the a refrigerating fan 28 is driven.

In a step S17, if the refrigerating compartment 23 starts a cooling operation by an operation of the refrigerating fan 28, the opening degree of the opening degree control means 40 is increased to increase the amount of the refrigerant flow, thereby lowering a pressure difference between the high pressure side and the low pressure side. At this time, the control unit switches the power-supply applied to the heater 47 in order to that the opening degree of the discharge hole 42 to be opened by the opening degree controller 43 corresponds to a pressure difference (i.e., P2) between the high pressure side and the low pressure sides, as shown in FIG. 6B.

In a step S18, the refrigerating compartment temperature TR is compared with a refrigerating compartment set temperature TR.S which is predetermined to preserve a fresh food in the refrigerating compartment. Herein, if the refrigerating compartment temperature TR is beyond the refrigerating compartment set temperature TR.S, steps S14 to S17 are repeated, thereby the refrigerating compartment is cooled by the refrigerating compartment set temperature TR.S. On the contrary, if the refrigerating compartment temperature TR is below the refrigerating compartment temperature TR in the step S18, the step S20 is performed.

Since the refrigerating compartment temperature 23 is cooled by the refrigerating compartment set temperature TR.S, the refrigerating compartment fan 28 stops operating in the step S20, thereby stopping the refrigerating operation. In the step S22, the freezer fan 30 is driven to perform a freezing operation, a heat exchange between the second evaporator 29' air and the freezing compartment's air is expedited according to a driving of the freezer fan 30.

In a step S24, the power-supply applied to the heater is switched in order to that a pressure difference between the high pressure side and the low pressure side is increased by reducing the opening degree of the opening degree control means 40, thereby lowering a heat generated from the heater 47. Therefore, an expansion rate of the silicon substrates 44 and 45 is reduced, a bending degree of the opening degree controller 43 is reduced, so that the opening degree of the refrigerant duct is reduced.

Figure 6A:
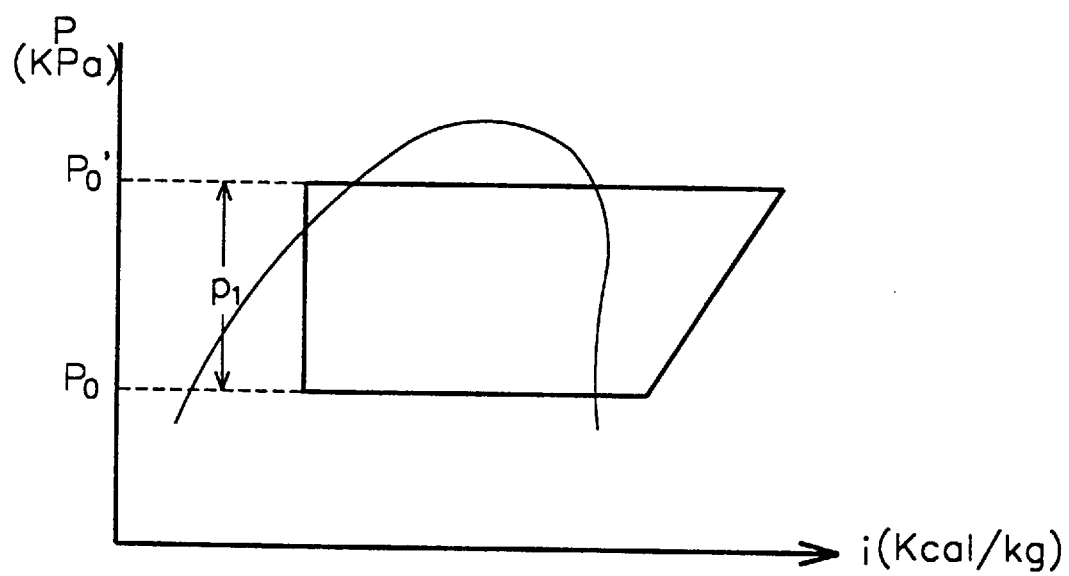
FIG. 6A is a graph of pressure versus entropy in a freezing operation of the refrigerator according to the present invention.
Figure 6B:
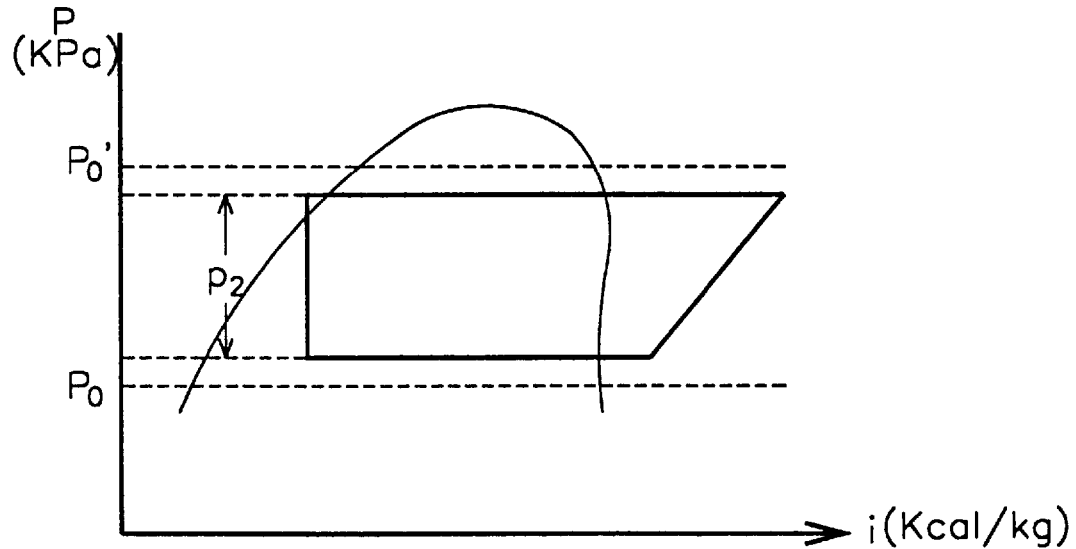
FIG. 6B is a graph of pressure versus entropy in a refrigerating operation of the refrigerator according to the present invention.

As shown in FIG. 6A being a graph of pressure versus entropy, in order to preserve a pressure difference P1 between the high pressure side and the low pressure side during the freezing operation, a compressing capacity of the compressor 31 becomes increased.

In a step S26, the freezing compartment temperature TF is compared with the freezing compartment set temperature TR.S which is predetermined to preserve a frozen food in the freezing compartment. Herein, if the freezing compartment temperature TF is below the freezing compartment set temperature TF.S, the freezer fan 30 stops operating in a step S28. At this time, the power-supply applied to the opening degree control means 40 is cut off and the silicon substrates 44 and 45 are contracted, because the compressor stops operating. Therefore, the discharge hole 42 is closed, and the refrigerant applied to the second evaporator 29 is cut off.

Figure 7B:
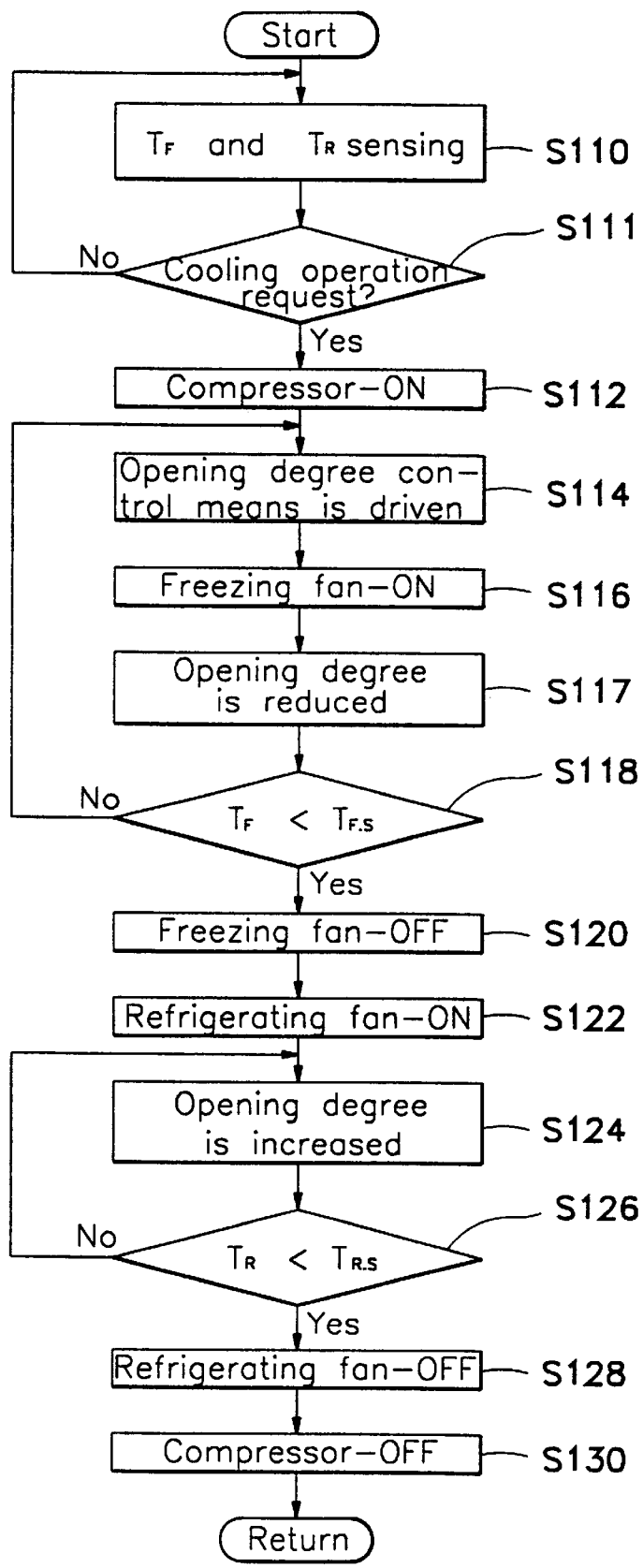
FIG. 7B is a control method for a refrigerator in accordance with another preferred embodiment of the present invention.

The control method of the refrigerator in accordance with the second preferred embodiment of the present invention is shown in FIG. 7B. As shown in FIG. 7B, the freezing compartment temperature TF and the refrigerating compartment temperature TR are sensed in a step S110. In a step S111, the temperatures TF and TR are compared with each reference temperatures, and it is determined whether or not at least one compartment requests a cooling operation. If the freezing compartment temperature TF or the refrigerating compartment temperature TR is beyond each reference temperature in the step S111, there is a cooling operation request, so that a compressor 31 is driven in a step S112.

In a step S114, after the compressor 31 and the opening degree control means 40 receive a power-supply, the opening degree control means 40 is open by a predetermined degree, thereby opening the refrigerant duct between the condenser 32 and the evaporators. More specifically, the heater 47 receiving the power-supply is heated, the discharge hole 42 is open by a predetermined degree due to expansions of silicon substrates 44 and 45, so that the refrigerant in the high pressure sides is depressurized by a predetermined degree and flows in the second evaporator 29.

In a step S116, in order to expedite a heat exchange of the refrigerating compartment' air in the second evaporator 29, the freezer fan 30 is driven.

In a step S117, if the freezing compartment 22 starts a cooling operation by an operation of the freezer fan 30, the opening degree of the opening degree control means 40 is lowered to reduce the amount of the refrigerant flow, thereby increasing a pressure difference between the high pressure side and the low pressure side. At this time, the control unit switches the power-supply applied to the heater 47 in order to that the opening degree of the discharge hole 42 to be opened by the opening degree controller 43 corresponds to a pressure difference (i.e., P1) between the high pressure side and the low pressure sides, as shown in FIG. 6A.

In a step S118, the freezing compartment temperature TF is compared with a refrigerating compartment set temperature TF.S which is predetermined to preserve a frozen food in the freezing compartment. Herein, if the freezing compartment temperature TF is beyond the freezing compartment set temperature TF.S, steps S114 to S117 are repeated, thereby the freezing compartment is cooled by the freezing compartment set temperature TF.S. On the contrary, if the freezing compartment temperature TF is below the freezing compartment temperature TF in the step S118, the step S120 is performed.

Since the freezing compartment temperature 22 is cooled by the freezing compartment set temperature TF.S, the freezing compartment fan 30 stops operating in the step S120, thereby stopping the freezing operation. In the step S122, the refrigerating fan 28 is driven to perform a refrigerating operation, a heat exchange between the first evaporator 27' air and the refrigerating compartment' air is expedited according to a driving of the refrigerating fan 28.

In a step S124, the power-supply applied to the heater 47 is switched in order to that a pressure difference between the high pressure side and the low pressure side is reduced by increasing the opening degree of the opening degree control means 40, thereby increasing a heat generated from the heater 47. Therefore, expansion rates of the silicon substrates 44 and 45 are increased, upward bending degree of the opening degree controller 43 is increased, so that the opening degree of the refrigerant duct is increased.

As shown in FIG. 6B being a graph of pressure versus entropy, although the first evaporator 27's temperature is higher than the second evaporator 29's temperature during a refrigerating operation, the refrigerating compartment 23 can be cooled by a temperature which is proper to efficiently cool the food therein. In order to preserve a pressure difference P2 between the high pressure side and the low pressure side during the refrigerating operation, a compressing capacity of the compressor 31 becomes lowered. If the compressing capacity of the compressor 31 is reduced, the power needed to the compressor 31 becomes lowered, thereby lowering unnecessary driving power of the compressor 31.

In a step S126, the refrigerating compartment temperature TR is compared with the refrigerating compartment set temperature TF.S which is predetermined to preserve a fresh food in the refrigerating compartment. Herein, if the refrigerating compartment temperature TR is below the refrigerating compartment set temperature TR.S, the refrigerating fan 28 stops operating in a step S128 and the compressor 31 stops operating in a step S130, thereby stopping a refrigerating operation. At this time, the power-supply applied to the opening degree control means 40 is cut off and the silicon substrates 44 and 45 are contracted, because the compressor 31 stops operating. Therefore, the discharge hole 42 is closed, and the refrigerant applied to the first evaporator 27 is cut off.

As described above, the present invention has an opening degree control means for controlling the amount of a refrigerant flow in order to vary a pressure difference between the high pressure sides and the low pressure sides, thereby lowering a power driving loss of the compressor and enhancing an energy efficiency.

What is claimed is:

1. A refrigerator, in a refrigerator which includes: a refrigerating loop which has a compressor for compressing a refrigerant, a condenser for condensing the refrigerant compressed, a refrigerating compartment and a freezing compartment which are divided to be separately cooled, first and second evaporators which are respectively mounted into the refrigerating and freezing compartments and in series connected to each other, and a refrigerating fan and a freezer fan which are respectively mounted in the refrigerating and freezing compartments; and thereby achieves a cooling cycle, the refrigerator, comprising:

opening degree control means for including a bendable structure so as to vary a pressure difference between a high pressure side and a low pressure side of the refrigerating loop according to a cooling operation of either the refrigerating compartment or the freezer compartment; and control unit for controlling a bending degree of the opening degree control means according to a kind of a driven fan after driving a corresponding fan responsive to a cool-driven compartment and adjusting a flow of the refrigerant.

2. The refrigerator as set forth in claim 1, wherein the opening degree control means which is mounted between the condenser and the first evaporator or mounted between the condenser and the second evaporator, and thus controls both a flow of the refrigerator and a pressure difference between the high pressure sides and the low pressure sides, comprising:

an intake hole for sucking a refrigerant;

a discharge hole whose inner diameter is smaller than that of the intake hole, for discharging the refrigerant; and an opening degree controller which includes a heater, two silicon substrates having a different heat expansion rate, and generates a bending so as to open the discharge hole while driving the heater.

3. The refrigerator as set forth in claim 1, wherein the control unit switches a power-supply applied to the heater when cooling the freezing compartment in order to maintain a first pressure difference value P1 between the high pressure side and the low pressure side, and switches a power-supply applied to the heater when cooling the refrigerating compartment in order to maintain a second pressure difference value P2 between the high pressure side and the low pressure side.

4. The refrigerator as set forth in claim 3, wherein the first pressure difference value P1 in cooling the freezing compartment is larger than the second pressure difference value P2 in cooling the refrigerating compartment.

5. A method for controlling a refrigerator, in a refrigerator which includes: a compressor for compressing a refrigerant, a condenser for condensing the refrigerant compressed, a refrigerating compartment and a freezing compartment which are divided to be separately cooled, first and second evaporators which are respectively mounted into the refrigerating and freezing compartments and in series connected to each other, and a refrigerating fan and a freezer fan which are respectively mounted in the refrigerating and freezing compartments, and an opening degree control means which is installed between the condenser and the evaporators so as to control a flow of the refrigerant, the method for controlling the refrigerator, comprising the steps of:

(a) sensing temperatures of the refrigerating and freezing compartments;

(b) determining whether or not at least one compartment requires a cooling operation by comparing the temperatures with predetermined temperatures of the refrigerating and freezing compartments;

(c) driving a corresponding fan for cooling a corresponding compartment when at least one compartment requires a cooling operation in the step (b); and (d) controlling a bending degree of the opening degree control means according to the corresponding driven fan in the step (c), and adjusting a flow of the refrigerant.

6. The method as set forth in claim 5, wherein:

if there is a cooling request of the refrigerating compartment in the step (b), the refrigerating fan is driven in the step (c), and the bending degree of the opening degree control means in the step (d) becomes larger.

7. The method as set forth in claim 5, wherein:

if there is a cooling request of the freezing compartment in the step (b), the freezer fan is driven in the step (c), and the bending degree of the opening degree control means in the step (d) becomes smaller.

* * * * *